United States Patent Office 3,706,005
Patented Dec. 12, 1972

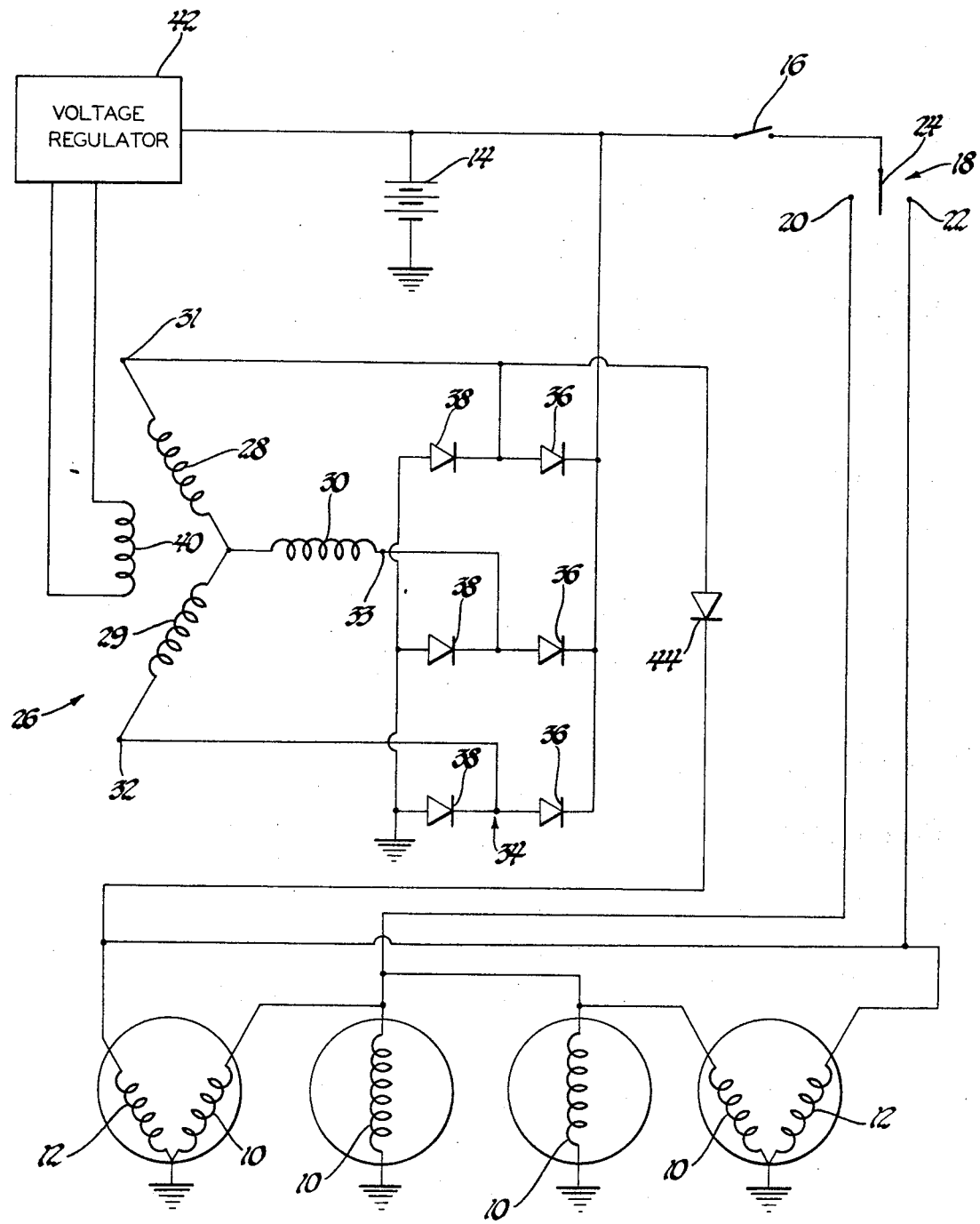

3,706,005
VEHICLE DAYTIME RUNNING LIGHTS
Richard A. Carlson, Pontiac, Mich., assignor to General Motors Corporation, Detroit, Mich.
Filed Dec. 10, 1970, Ser. No. 96,688
Int. Cl. B60q 1/04
U.S. Cl. 315—82                                     2 Claims

ABSTRACT OF THE DISCLOSURE

A dual intensity lighting circuit in which the low beam filaments of the vehicle headlamps are energized to produce less light output when the vehicle engine is running, and the low beam filaments are not energized through the conventional headlight lighting system, than when they are energized through the conventional lighting system. The output from one of the output terminals of a three phase alternating current generator is supplied to the low beam filaments to provide for the diminished illumination through a blocking diode.

---

This invention relates to a dual intensity lighting circuit for providing diminished illumination of the vehicle low beam headlamp filaments during daytime operation.

Vehicle headlamp circuits to provide for one level of light output for night driving and another lower level for day driving are known. To accomplish this decreased level of light output for day driving, prior circuits have placed an impedance in series with the headlamp filaments, with a resulting decrease in the light output of the headlamp filaments.

It is the general object of this invention to provide for a reduced light output of the vehicle headlamps for daytime operation without the use of an impedance in series with the headlamp filaments.

It is a more specific object of this invention to provide for a circuit for energizing the low beam headlamp filaments at reduced brilliance by using the output of one of the output terminals of the vehicle alternating current generator.

These and other objects of the invention may be best understood by reference to the following description of a preferred embodiment and the figure which is a schematic diagram of the preferred embodiment of this invention.

Referring to the figure, there is shown a lighting circuit for energizing the high beam filaments 10 and the low beam filaments 12 of the vehicle headlamps. For night driving, the high beam filaments 10 and the low beam filaments 12 are energized in the conventional manner by supplying power from the positive terminal of a DC voltage source 14, which may be, for example, the vehicle battery, to either the high beam filaments 10 or the low beam filaments 12 through a light switch 16 and a dimmer switch 18 which includes the stationary contacts 20 and 22 and the movable contact 24. It can be seen, when the light switch 16 is closed, the high beam filaments 10 are energized by the actuation of the dimmer switch 18 to position the movable contact 24 into engagement with the stationary contact 20. In like manner, the low beam filaments 12 are energized by the actuation of the dimmer switch 18 to position the movable contact 24 into engagement with the stationary contact 22.

Also shown in the figure is a direct current power source 26 which takes the form of a diode rectified alternating current generator which is used to supply charging current to the DC voltage source 14 and to supply other electrical loads on the motor vehicle when the generator is driven by the vehicle engine. The direct current power source 26 includes an alternating current generator having three phase Y-connected windings 28, 29 and 30 having output terminals 31, 32 and 33 respectively. The output terminals 31, 32 and 33 are connected with the AC input terminals of a three phase, full-wave bridge rectifier 34 comprised of positive diodes 36 and negative diodes 38. The cathodes of the positive diodes 36 are connected to the positive terminal of the DC voltage source 14 and the anodes of the diodes 38 are connected directly to ground. With this arrangement, the voltage developed between the cathodes of the diodes 36 and ground is utilized to charge the DC voltage source 14 and to energize other electrical loads on the vehicle which are not shown.

The alternating current generator 26 has a field winding 40 which controls the output of the alternating current generator 26. A voltage regulator 42 senses the output voltage of the three phase, full-wave bridge rectifier 34 and controls the input to the field winding 40 to maintain the output of the three phase full-wave bridge rectifier 34 at a constant level.

What has been described are conventional vehicle generating, regulating and lighting circuits. To provide for the energization of the low beam filaments 12 at a reduced brilliance for daylight driving, the output terminal 31 of the alternating current generator 26 is connected to the low beam filaments 12 through a diode 44. Therefore, when the vehicle engine is running and driving the alternating current generator 26, a voltage waveform is supplied to the low beam filaments 12 through the diode 44, the low beam filaments 12 being energized thereby. The output from the output terminal 31 is a pulsating voltage waveform having an amplitude approximately equal to the output of the DC voltage source 14. Consequently, the brilliance of the low beam filaments is diminished with respect to the brilliance of the low beam filaments 12 when energized through the light switch 16 and the dimmer switch 18. The diode 44 provides a blocking function during the time when the potential at the output terminal 31 is less than the potential at the positive terminal of the DC voltage source 14 and the low beam filaments 12 are energized through the light switch 16 and the dimmer switch 18.

The detailed description of a preferred embodiment of the invention for the purpose of explaining the principles thereof is not to be considered as limiting or restricting the invention since many modifications may be made by the exercise of skill in the art without departing from the scope of the invention.

It is claimed:
1. A dual intensity lighting circuit for a motor vehicle comprising in combination with a DC voltage source having two terminals, a three-phase alternating current generator driven by the vehicle engine having three output terminals and a bridge rectifier circuit for rectifying the output of the generator and supplying a DC charging voltage to one terminal of the DC voltage source; at least one electric lamp having two filaments; means for connecting one end of all of said filaments to the other terminal of said DC voltage source; means for connecting the other end of one of said filaments of each said lamp and the other end of the other one of said filaments of each said lamp to the first mentioned terminal of said DC voltage source through respective switch means, each having an open and a closed position; a diode; and means for connecting the end of a selected one of said filaments of each said lamp connected to the said first mentioned terminal of said DC voltage source to one of said output terminals of said alternating current generator through said diode, poled to conduct current in a direction from said output terminal of said generator to said filament, whereby that filament of said lamp may be energized by said DC voltage source when the corresponding said switch means is in the closed position and by said alternating current generator when the corresponding said switch means is in the open position.

2. A dual intensity lighting circuit for a motor vehicle comprising in combination with a DC voltage source having a grounded terminal and an ungrounded terminal, a three-phase alternating current generator driven by the vehicle engine having three output terminals and a bridge rectifier circuit for rectifying the output of the generator and supplying a DC charging voltage to the ungrounded terminal of the DC voltage source; at least one electric lamp having two filaments; means for connecting one end of all of said filaments to the said grounded terminal of said DC voltage source; means for connecting the other end of one of said filaments of each said lamp and the other end of the other one of said filaments of each said lamp to the said ungrounded terminal of said DC voltage source through respective switch means, each having an open and a closed position; a diode; and means for connecting the end of a selected one of said filaments of each said lamp connected to said ungrounded terminal of said DC voltage source to one of said output terminals of said alternating current generator through said diode, poled to conduct current in a direction from said output terminal of said generator to said filament, whereby that filament of said lamp may be energized by said DC voltage source when the corresponding said switch means is in the closed position and by said alternating current generator when the corresponding said switch means is in the open position.

References Cited
UNITED STATES PATENTS 3,397,342   8/1968   Dill, Jr.   315—82 X
3,447,029   5/1969   Dill, Jr.   315—80

PAUL L. GENSLER, Primary Examiner

U.S. Cl. X.R.

240—7.1 A; 315—Dig. 4